US010390221B2

(12) United States Patent
Lawlis et al.

(10) Patent No.: US 10,390,221 B2
(45) Date of Patent: Aug. 20, 2019

(54) PRIVATE VEHICLE-TO-VEHICLE COMMUNICATION

(71) Applicant: Ford Global Technologies, LLC, Dearborn, MI (US)

(72) Inventors: James Martin Lawlis, Grosse Pointe Farms, MI (US); Omar Makke, Lyon Township, MI (US); Haysam M. Kadry, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 15/218,945

(22) Filed: Jul. 25, 2016

(65) Prior Publication Data
US 2018/0027600 A1 Jan. 25, 2018

(51) Int. Cl.
*H04W 76/23* (2018.01)
*H04W 12/04* (2009.01)
*G06K 9/32* (2006.01)
*H04L 9/14* (2006.01)
*H04L 9/30* (2006.01)
*H04L 29/06* (2006.01)
*H04W 12/06* (2009.01)
*H04W 4/70* (2018.01)
*H04W 76/14* (2018.01)
*H04L 9/08* (2006.01)
*H04L 29/08* (2006.01)

(52) U.S. Cl.
CPC ............ *H04W 12/04* (2013.01); *G06K 9/325* (2013.01); *H04L 9/0822* (2013.01); *H04L 9/0825* (2013.01); *H04L 9/0866* (2013.01); *H04L 9/0869* (2013.01); *H04L 9/14* (2013.01); *H04L 9/30* (2013.01); *H04L 63/0435* (2013.01); *H04L 63/06* (2013.01); *H04L 63/0876* (2013.01); *H04W 4/70* (2018.02); *H04W 12/06* (2013.01); *H04W 76/14* (2018.02); *H04L 67/12* (2013.01); *H04L 2209/805* (2013.01); *H04L 2209/84* (2013.01)

(58) Field of Classification Search
CPC .................................................. H04W 76/23
USPC ........................................................ 713/168
See application file for complete search history.

(56) References Cited

U.S. PATENT DOCUMENTS

| 7,742,603 | B2 | 6/2010 | Tengler et al. |
|---|---|---|---|
| 8,526,606 | B2 | 9/2013 | Muthaiah |
| 8,843,997 | B1 | 9/2014 | Hare |
| 8,995,662 | B2 | 3/2015 | Rubin et al. |

(Continued)

OTHER PUBLICATIONS

Search Report dated Dec. 11, 2017 for GB Patent Application No. GB 1711723.5 (3 pages).

*Primary Examiner* — Jacob Lipman
(74) *Attorney, Agent, or Firm* — Frank Lollo; Neal, Gerber & Eisenberg LLP; James P. Muraff

(57) ABSTRACT

Systems and methods are disclosed for private vehicle-to-vehicle communication. An example disclosed vehicle communication system includes sensors to monitor a target vehicle, and a controller. The example controller generates a pseudo-anonymous identifier based on an identifier and an attribute of the target vehicle. Additionally, the controller broadcasts a first message including the pseudo-anonymous identifier, a random number, and a public key. In response to receiving a second message including the identifier and the random number, the example controller broadcasts a third message encrypted with a symmetric key included in the second message.

20 Claims, 4 Drawing Sheets

(56) References Cited

U.S. PATENT DOCUMENTS

2012/0155636 A1 6/2012 Muthaiah
2014/0055288 A1 2/2014 Menzel
2015/0052352 A1 2/2015 Dolev

PRIVATE VEHICLE-TO-VEHICLE COMMUNICATION

TECHNICAL FIELD

The present disclosure generally relates to vehicle communication systems and, more specifically, private vehicle-to-vehicle communication.

BACKGROUND

In the U.S., the Dedicated Short Range Communication (DSRC) network is being deployed as a part of the Intelligent Transportation System. DSRC facilitates vehicles communicating with other vehicles to coordinate driving maneuvers and provide warnings about potential road hazards. Additionally, DSRC facilitates communicating with infrastructure-based nodes, such as toll booths and traffic signals. The aim of deploying the DSRC protocol is to reduce fatalities, injuries, property destruction, time lost in traffic, fuel consumption, exhaust gas exposure, among others.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for private vehicle-to-vehicle communication. An example disclosed vehicle communication system includes sensors to monitor a target vehicle, and a controller. The example controller generates a pseudo-anonymous identifier based on an identifier and an attribute of the target vehicle. Additionally, the controller broadcasts a first message including the pseudo-anonymous identifier, a random number, and a public key. In response to receiving a second message including the identifier and the random number, the example controller broadcasts a third message encrypted with a symmetric key included in the second message.

An example method to establish private communication with a target vehicle includes generating a pseudo-anonymous identifier based on an identifier and an attribute of the target vehicle. The example method also includes broadcasting a first message including the pseudo-anonymous identifier, a random number, and a public key; and Additionally, the example method includes, in response to receiving a second message including the identifier and the random number, broadcasting a third message encrypted with a symmetric key included in the second message.

An example method to privately communicate between a first and second vehicle includes the first vehicle generating a first pseudoanonymous identifier based on a discernible identifier and a measurable attribute of the second vehicle. The first vehicle broadcasts an initial message that includes the first pseudoanonymous identifier, a random number, and a public key. The second vehicle compares the first pseudoanonymous to a second pseudoanonymous identifier generated by the second vehicle based the discernible identifier and measurable attribute of the second vehicle. The second vehicle, in response to a match, generates a response message encrypted with the public key. The response message includes the random number, the discernible identifier of the second vehicle, and a symmetric key. The first vehicles communicates with second vehicle using the symmetric key when the random number and the discernible identifier of the second vehicle in the response message match the discernible identifier used to generate the first pseudoanonymous identifier and the random number in the initial message.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
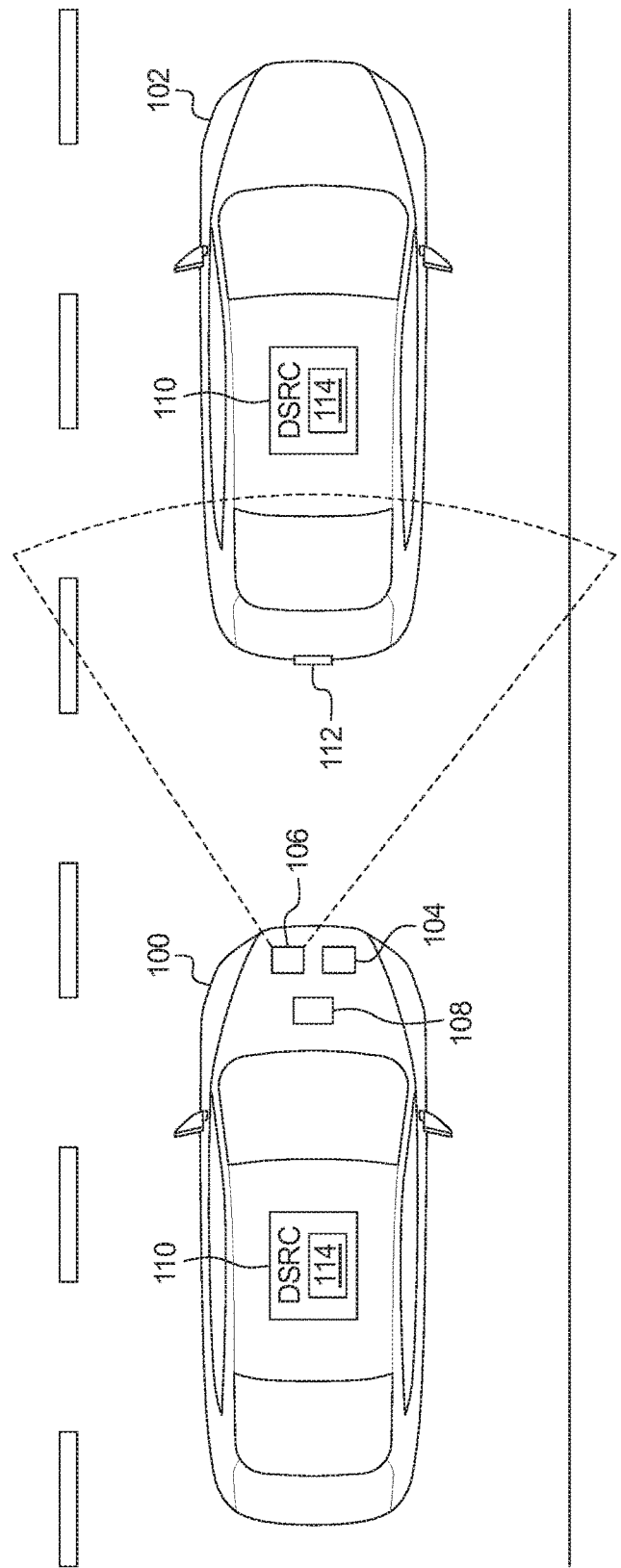
FIG. 1 illustrates vehicles establishing private communication in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicle equipped with vehicle-to-vehicle communication, such as dedicated short range communication (DSRC), broadcast messages that include information regarding the speed, heading, location, and/or detected hazards, etc. Vehicle within range of the transmitting vehicle receive the messages. However, vehicles may engage in activities that involve coordination with one or more specific other vehicles without other vehicles privy to the content of the exchanged messages. For example, two or more vehicles may be forming a coordinated convoy to travel together. In such situations, the vehicles establish anonymous or psuedo-anonymous communication. That is, the vehicles communicate via encrypted message without other vehicles within range knowing which two vehicles are in communication. Traditionally, third parties, known as certificate authorities, register certificates that facilitate establishing encrypted communication between two entities (e.g., two vehicles). The certificates are used to verify that the entities are who advertise to be. Each entity verifies the certificate of the other entity. This requires communication (e.g., via the Internet, etc.) between the two vehicles and a certificate authority (sometime referred to has a "trusted authority'). However, to use the certificate authority, a vehicle must maintain a registration with the certificate authority. Additionally, a connection to an external network is not always available, and certificate authorities may become compromised.

As disclosed below, vehicles include DSRC modules that establish anonymous or psuedo-anonymous encrypted communication without a certificate authority. To establish communication, the vehicle that initiates the communication (sometimes referred to as the "transmitting vehicle") determines a discernible identifier and a measurable attribute of the target vehicle (sometimes referred to as the "receiving vehicle"). The discernible identifier is an attribute of the vehicle that is relatively static attribute (e.g., is constant over the time frame that the vehicles are communicating) of the receiving vehicle that is identifiable by the transmitting vehicle. For example, the discernible identifier may be a license plate number, an alphanumeric value transmitted by a short range wireless node (e.g., a Bluetooth Low Energy (BLE) node), an alphanumeric value affixed (e.g., via a sticker, etc.) to the receiving vehicle, or a paint color, etc. The measurable attribute is a relatively variable attribute (e.g., changes over the time the vehicle is being driven) that is measurable by the transmitting vehicle. For example, the measurable attribute may be the receiving vehicle's speed, the time, the receiving vehicle's coordinates (e.g., from a global positioning system (GPS) receiver), or the receiving vehicle's compass direction, etc.

The transmitting vehicle generates a first psuedo-anonymous identifier by hashing the discernible identifier and the measurable attribute using a hash function such as MD5, a Secure Hash Algorithm (SHA) implementation (such as SHA-256, SHA-512, SHA3, etc.), or a BLAKE hash function implementation (such as BLAKE2b, BLAKE2s, etc.). Additionally, the transmitting vehicle generates a random or pseudo-random number. The transmitting vehicle broadcasts an initial message that includes the first psuedo-anonymous identifier, the random number, and a public encryption key that corresponds to a private encryption key (that is not broadcast). Vehicles that receive the broadcast generate a second psuedo-anonymous identifier by hashing its discernible identifier and its measurable attribute using the same hash function as the transmitting vehicle. For example, the vehicle may generate the second psuedo-anonymous identifier by hashing using its license plate number and its speed. The vehicle compares the first psuedo-anonymous identifier in the received initial message to the second psuedo-anonymous identifier to determine whether the vehicle is the intended target (e.g, the receiving vehicle.) If the first psuedo-anonymous identifier and the second psuedo-anonymous identifier match, the receiving vehicle generates an encrypted response message using the public key. The encrypted response message includes the unhashed discernible identifier, the unhashed measurable attribute, the random number, and a symmetric encryption key. The receiving vehicle broadcasts the response message. When the transmitting vehicle receives the response message, the transmitting vehicle decrypts the response message using its private key corresponding to the public key in the initial message. The transmitting vehicle verifies the unhashed discernible identifier and the unhashed measurable attribute in the response message with the discernible identifier and the measurable attribute included in the first psuedo-anonymous identifier. If the two sets of values match, the transmitting vehicle continues to communicate with the receiving vehicle via message encrypted by the symmetrical key.

FIG. 1 illustrates vehicles 100 and 102 establishing private communication in accordance with the teachings of this disclosure. The vehicles 100 and 102 may be standard gasoline powered vehicles, hybrid vehicles, electric vehicles, fuel cell vehicles, and/or any other mobility implement type of vehicle. The vehicles 100 and 102 included parts related to mobility, such as a powertrain with an engine, a transmission, a suspension, a driveshaft, and/or wheels, etc. The vehicles 100 and 102 may be non-autonomous, semi-autonomous, or autonomous. In the illustrated example the transmitting vehicle 100 includes sensors 104 and 106 and a GPS receiver 108. The vehicles 100 and 102 include dedicated short range communication (DSRC) modules 110.

The sensors 104 and 106 determine the discernible identifier and the measurable attribute of the receiving vehicle 102. The sensors 104 and 106 include any suitable sensor to detect and/or measure the the discernible identifier and the measurable attribute. For example, the sensors 104 and 106 may include camera(s), range detection sensor(s) (e.g., ultrasonic sensors, RADAR, LiDAR, etc.), and/or BLE wireless nodes, etc. For example, the sensors may include a camera 104 to perform license plate recognition on a license plate 112 of the receiving vehicle 102, and ultrasonic sensors 106 to measure the speed of the receiving vehicle 102. The GPS receiver 108 provides coordinates and a compass heading of the transmitting vehicle 100 which may be used to determine the coordinates and the compass heading of the receiving vehicle 102.

The example DSRC modules 110 include antenna(s), radio(s) and software to broadcast messages and to establish connections between the vehicles 100 and 102, infrastructure-based modules (not shown), and mobile device-based modules (not shown). More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE-_SyRS_RevA %20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.)

In the illustrated example, the DSRC modules 110 include an encryption controller 114. The encryption controller 114 uses the discernible identifier and the measurable attribute of the receiving vehicle 102 obtained by the sensors 104 and 106 to establish pseudo-anonymous private communication between the transmitting vehicle 100 and the receiving vehicle 102. The encryption controller 114 generates a first psuedo-anonymous identifier by hashing the discernible identifier and the measurable attribute using a one-way hash function. In some examples, to provide tolerance, the encryption controller 114 rounds (e.g., to the next multiple of five, etc.) the measurable attribute before using the hash function to generate the pseudo-anonymous identifier. For example, if the speed of the receiving vehicle 102 is measured to be 39 miles per hour, the encryption controller 114 may round the measurable attribute to be 40 miles per hour. The one-way hash function transforms a combination of the discernible identifier and the measurable attribute into a data value (e.g., the pseudo-anonymous identifier) of a fixed size (e.g., 128 bits, 256 bits, 384 bits, 512 bits, etc.). For example, the discernible identifier is "C2HOHX2" and the measurable attribute is "40", the psudeo-anonymous identifier may be "31NTNFFERKMNB9IHG1XWOQE891SI6R11." Additionally, the encryption controller 114 generates a random or pseudo-random number.

The DSRC module 110 broadcasts an initial message that includes the first psueo-anonymous identifier, the random number, and a public encryption key ($k_{pub}$). The public key ($k_{pub}$) corresponds to a private encryption key ($k_{pri}$). The public key ($k_{pub}$) is used to encrypt a response message that may be decrypted by the private key ($k_{pri}$) but not the public key ($k_{pub}$). In some examples, the public key ($k_{pub}$)/private key ($k_{pri}$) pair is generated (e.g., via the RSA protocol, etc.) when the DSRC module 110 is manufactured. Alternatively, in some examples, the public key ($k_{pub}$)/private key ($k_{pri}$) pair is regenerated from time-to-time by the encryption controller 114.

The encryption controller 114 of the DSRC modules 110 of the vehicles that receive the initial message (a) measure the measurable attribute corresponding the vehicle, and (b) generate a second psueo-anonymous identifier by hashing the discernible identifier of the vehicle and measurable attribute and the of the vehicle using the same hash function as the encryption controller 114 of the transmitting vehicle 100. For example, the encryption controller 114 of the vehicles may generate the second psueo-anonymous identifier by hashing using its license plate number and its speed. In such an example, the vehicle, via a speed sensor, may measure its speed to be 37 miles per hours. In some examples, the measureable attribute is established by the manufacturer of the DSRC module 110. Alternatively, in some examples, the initial message includes a value that identifies the measureable attribute that was used to create the first pseudo-anonymous identifier. The encryption controllers 114 of the vehicles that receive the initial message compare the first psueo-anonymous identifier in the received initial message to the second psueo-anonymous identifier to determine whether the vehicle is the intended target (e.g, the receiving vehicle 102.)

If the first psueo-anonymous identifier and the second psueo-anonymous identifier match, the encryption controller 114 of the receiving vehicle 102 generates an encrypted response message using the public key. The encrypted response message includes (i) the unhashed discernible identifier of the receiving vehicle 102, (ii) the unhashed measurable attribute of the receiving vehicle 102, (iii) the random number included in the initial message, and (iv) a symmetric encryption key ($k_{sym}$). The DSRC module 110 of the receiving vehicle 102 broadcasts the response message.

When the transmitting vehicle 100 receives the response message, the encryption controller 114 decrypts the response message using its private key ($k_{pri}$) corresponding to the public key ($k_{pub}$) included in the initial message. The encryption controller 114 compares the unhashed discernible identifier and the unhashed measurable attribute in the response message to the discernible identifier and the measurable attribute included in the first pseudo-anonymous identifier. If the two sets of values match, the encryption controller 114 encrypts messages directed to the receiving vehicle 102 with the symmetrical key ($k_{sym}$).

In some examples, the transmitting vehicle 100 establishes private communication as described herein with an infrastructure node (e.g. a DSRC module affixed to a non-mobile structure, such as a building or a traffic signal). For example, an infrastructure node may be affixed to a menu board of a drive-through restaurant. In such examples, the discernible identifier and the measureable attribute are supplied by the infrastructure node via, for example, a display and/or a BLE transmitter. For example, a menu board may provide a random number as the measurable attribute on a display and transmit the discernible identified via the BLE transmitter. In such examples, the infrastructure node acts as if it were the receiving vehicle 102. In such a manner, private communication may be established between the transmitting vehicle 100 and the infrastructure node to facilitate, for example, exchanging payment information or other sensitive data.

Figure 2:
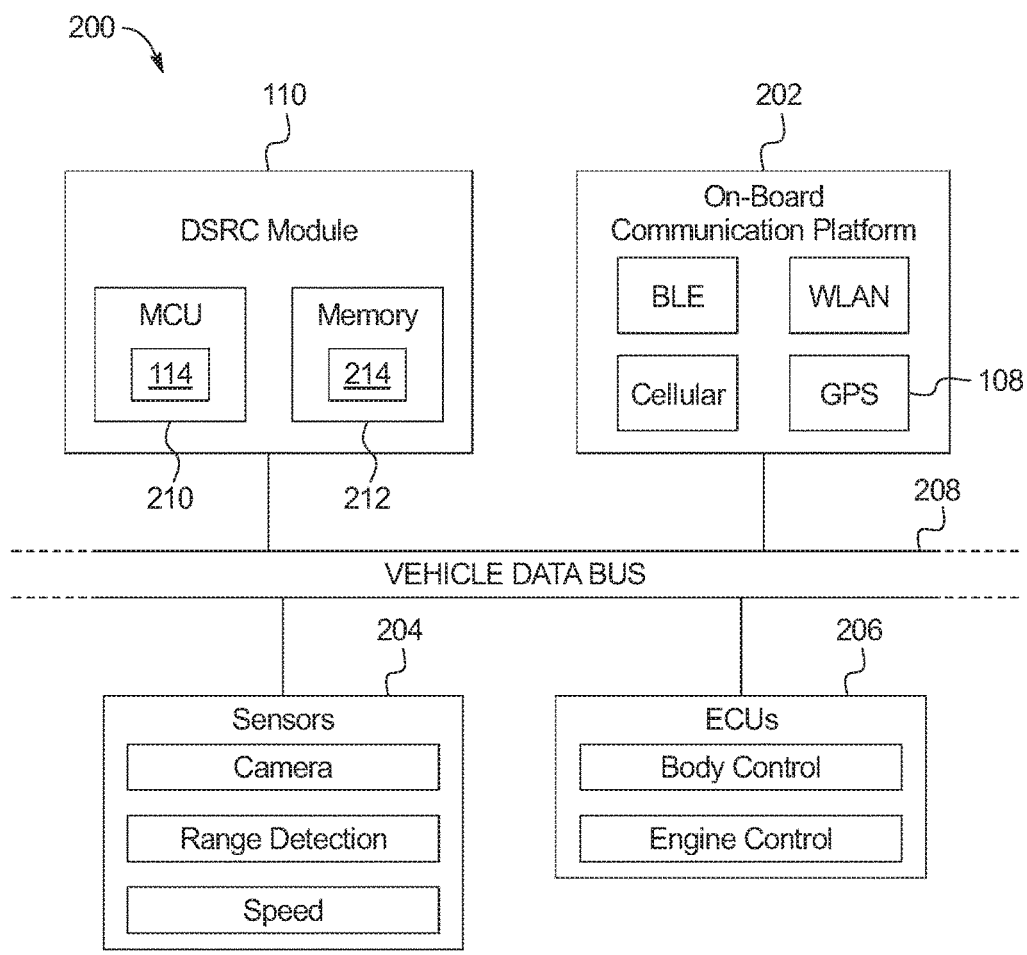
FIG. 2 is a block diagram of electronic components of the vehicles of FIG. 1.

FIG. 2 is a block diagram of electronic components 200 of the vehicles 100 and 102 of FIG. 1. In the illustrated example, the vehicles 100 and 102 include an on-board communications platform 202, the DSRC module 110, sensors 204, electronic control units (ECUs) 206, and a vehicle data bus 208.

The on-board communications platform 202 includes wired or wireless network interfaces to enable communication with external networks. The on-board communications platform 202 also includes hardware (e.g., processors, memory, storage, antenna, etc.) and software to control the wired or wireless network interfaces. In some examples, the on-board communications platform 202 includes controllers for Bluetooth® and/or other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). The on-board communications platform 202 also includes the GPS receiver. Further, the external network(s) may be a public network, such as the Internet; a private network, such as an intranet; or combinations thereof, and may utilize a variety of networking protocols now available or later developed including, but not limited to, TCP/IP-based networking protocols.

In the illustrated example, the DSRC module 110 includes a processor or controller 210 and memory 212. The processor or controller 210 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The processor or controller 210 is structured to include the encryption controller 114. The memory 212 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory. In some examples, the memory 212 includes secure memory 214 to store the private key ($k_{pri}$)

The memory 212 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 212, the computer readable medium, and/or within the processor 210 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 204 are located in and around the vehicle 100 and 102 to monitor the operational state of the vehicle 100 and 102 and to monitor the area proximate the vehicle 100 and 102. The sensors 204 include the sensors 104 and 106 of FIG. 1. Additionally, the sensors 204 include a speed sensor to monitor the speed of the vehicle 100 and 102. For example, when a vehicle receives an initial message based on a speed value, the vehicle may determine its speed via the speed sensor.

The ECUs 206 monitor and control the systems of the vehicle 100 and 102. The ECUs 206 communicate and exchange information via the vehicle data bus 208. Additionally, the ECUs 206 may communicate properties (such as, status of the ECU 206, sensor readings, control state, error and diagnostic codes, etc.) to and/or receive requests from other ECUs 206. Some vehicles 100 and 102 may have seventy or more ECUs 206 located in various locations around the vehicle 100 and 102 communicatively coupled by the vehicle data bus 208. The ECUs 206 are discrete sets of electronics that include their own circuit(s) (such as integrated circuits, microprocessors, memory, storage, etc.) and firmware, sensors, actuators, and/or mounting hardware.

In the illustrated example, the vehicle data bus 208 includes one or more data buses wired throughout the vehicle 100 and 102. The vehicle data bus 208 communicatively couples the on-board communications platform 202, ECUs 206, the sensors 204, and the DSRC module 110. In some examples, the vehicle data bus 208 is implemented in accordance with the controller area network (CAN) bus protocol as defined by International Standards Organization (ISO) 11898-1. Alternatively or additionally, in some examples, the vehicle data bus 208 may include a Media Oriented Systems Transport (MOST) bus, or a CAN flexible data (CAN-FD) bus (ISO 11898-7).

Figure 3:
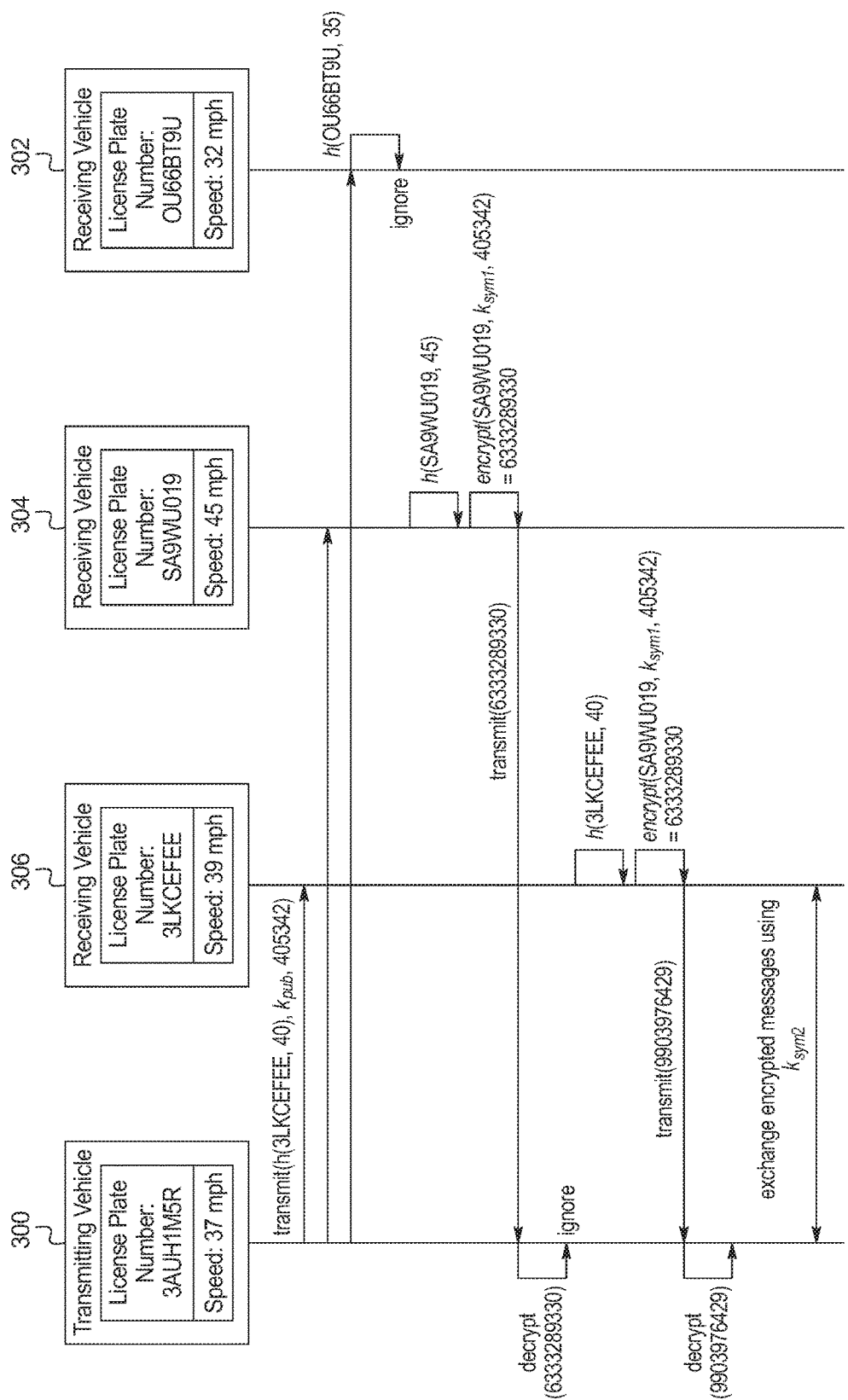
FIG. 3 is a diagram that illustrates establishing private communication between the vehicles of FIG. 1.

FIG. 3 is a diagram that illustrates establishing private communication between the vehicles 100 and 102 of FIG. 1. Initially, a transmitting vehicle 300 broadcasts an initial message that includes (a) pseudo-anonymous identifier based on a hash h( ) of the discernible identifier (e.g., "3LKCEFEE" and the rounded measurable attribute (e.g., "40") of the target vehicle, (b) the public key ($k_{pub}$) of the vehicle 300, and (c) a random or pseudo-random number. In the illustrated example, a first proximate vehicle 302 receives the broadcasted initial message. The first proximate vehicle 302 generates a second pseudo-anonymous identifier based on the hash h( ) of the discernible identifier (e.g., "OU66BT9U") and the rounded measurable attribute (e.g., "35") of the first proximate vehicle 302. Because the discernible identifier and the rounded measurable attribute of the target vehicle are different than the discernible identifier and the rounded measurable attribute of the first proximate vehicle 302, the hash h( ) of the values is different, and the first proximate vehicle 302 ignores the initial message.

In the illustrated example, a second proximate vehicle 304 receives the broadcasted initial message. The second proximate vehicle 304 generates a second pseudo-anonymous identifier based on the hash h( ) of the discernible identifier (e.g., "SA9WU019") and the rounded measurable attribute (e.g., "45") of the second proximate vehicle 304. Despite the second pseudo-anonymous identifier and the first pseudo-anonymous identifier not matching, the second proximate vehicle 304 generates and broadcasts a response message using the public key ($k_{pub}$) provided in the initial message. For example, the second proximate vehicle 304 may be experiencing an error or may be acting maliciously. The example response message includes (a) the discernible identifier of the second proximate vehicle 304, (b) the random number provided by the initial message, and (c) a symmetrical key ($k_{sym1}$). The transmitting vehicle 300 receives the response message and decrypts it using the private key ($k_{pri}$) corresponding to the public key ($k_{pub}$) included in the initial message. The transmitting vehicle 300 compared the discernible identifier in the initial message with the disenable identifier in the response message. In the illustrate example, because the discernible identifier and the random number in the initial message with the disenable identifier in the response message are different, the transmitting vehicle 300 ignores the response message.

A third proximate vehicle 306 receives the broadcasted initial message. The second proximate vehicle 304 generates a second pseudo-anonymous identifier based on the hash h( ) of the discernible identifier (e.g., "3LKCEFEE") and the rounded measurable attribute (e.g., "40") of the third proximate vehicle 304. Because the second pseudo-anonymous identifier and the first pseudo-anonymous identifier match, the third proximate vehicle 306 generates and broadcasts a response message using the public key ($k_{pub}$) provided in the initial message. The example response message includes (a) the discernible identifier of the second proximate vehicle 304, (b) the random number provided by the initial message, and (c) a symmetrical key ($k_{sym2}$). The transmitting vehicle 300 receives the response message and decrypts it using the private key ($k_{pri}$) corresponding to the public key ($k_{pub}$) included in the initial message. The transmitting vehicle 300 compared the discernible identifier and the random number in the initial message with the disenable identifier and the random number in the response message. Because the values match, the transmitting vehicle 300 broadcasts messages intended for the third proximate vehicle 306 encrypted by the symmetrical key ($k_{sym2}$), and vice versa.

Figure 4:
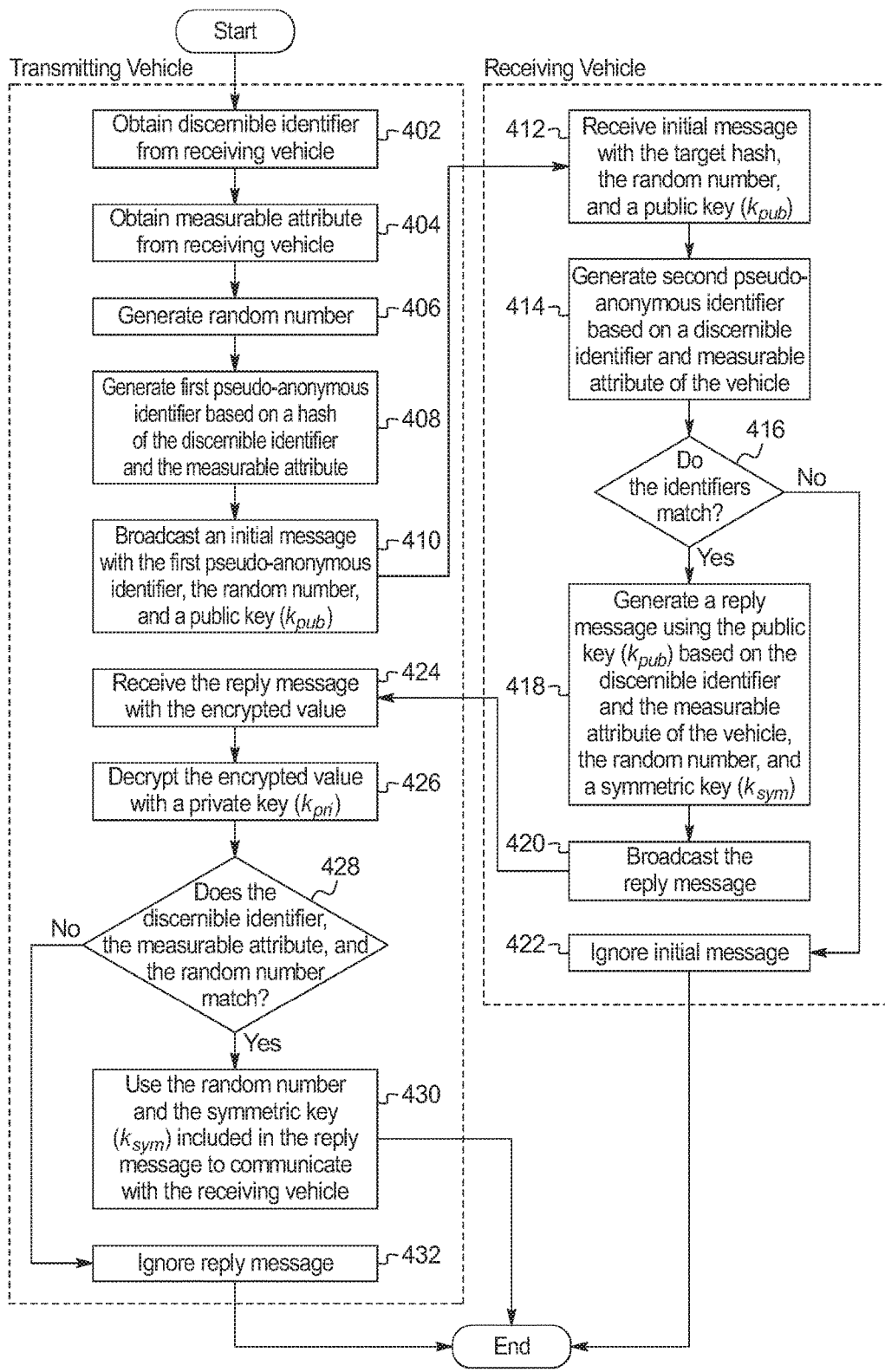
FIG. 4 is a flow chart of a method to establish private communication between the vehicles of FIG. 1 that may be implemented by the electronic components of FIG. 2.

FIG. 4 is a flow chart of a method to establish private communication between the vehicles 100 and 102 of FIG. 1 that may be implemented by the electronic components 200 of FIG. 2. Initially, at block 402, the encryption controller 114 of the transmitting vehicle 100 obtains, via the sensor 104 (e.g., a camera), the discernible identifier from the receiving vehicle 102. At block 404, the encryption controller 114 of the transmitting vehicle 100 obtains the measurable attribute, via the sensor 106 (e.g., an ultrasonic sensor), of the receiving vehicle 102. At block 406, the encryption controller 114 of the transmitting vehicle 100 generates a random or pseudo-random number. At block 408, the encryption controller 114 of the transmitting vehicle 100 generates the first pseudo-anonymous identifier based on the discernible identifier obtained at block 402 and the measurable attribute obtained at block 404. At block 410, the encryption controller 114 of the transmitting vehicle 100 broadcasts an initial message that includes (i) the first pseudo-anonymous identifier generated at block 408, (ii) the random number generated at block 406, and (iii) a public key ($k_{pub}$).

At block 412, the encryption controller 114 of the receiving vehicle 102 receives the initial message broadcast by the transmitting vehicle 100 at block 410. At block 414, the encryption controller 114 of the receiving vehicle 102 generates the second pseudo-anonymous identifier based on a hash of the discernible identifier of the receiving vehicle 102 and the measureable attribute of the receiving vehicle 102. At block 416, the encryption controller 114 of the receiving vehicle 102 determines whether the second pseudo-anonymous identifier generated at block 414 matches the first pseudo-anonymous identifier included in the initial message. If the second pseudo-anonymous identifier matches the first pseudo-anonymous identifier, the method continues at block 418. Otherwise, if the second pseudo-anonymous identifier does not match the first pseudo-anonymous identifier, the method continues at block 422.

At block 418, the encryption controller 114 of the receiving vehicle 102 generates a reply message using the public key ($k_{pub}$) included in the initial message. The reply message includes (a) the unhashed discernible identifier and/or the unhashed measureable attribute, (b) the random number included in the initial message, and (c) a symmetric key ($k_{sym}$). At block 420, the encryption controller 114 of the receiving vehicle 102 broadcasts the reply message. At block 422, the encryption controller 114 of the receiving vehicle 102 ignores the initial message.

At block 424, the encryption controller 114 of the transmitting vehicle 100 receives the response message from the receiving vehicle 102. At block 426, the encryption controller 114 of the transmitting vehicle 100 decrypts the response message using the private key ($k_{pri}$) corresponding to the public key ($k_{pub}$) included in the initial message. At block 428, the encryption controller 114 of the transmitting vehicle 100 determines whether the discernible identifier and/or the measurable attribute and the random number included in the response message match the discernible identifier and/or the measurable attribute and the random number included in the initial message. If the values match, the method continues at block 430. If the values do not match, the method continues at block 432. At block 430, the encryption controller 114 of the transmitting vehicle 100 uses the random number and the symmetric key ($k_{sym}$) included in the response message to communicate with the receiving vehicle 102. At block 432, the encryption controller 114 of the transmitting vehicle 100 ignores the response message.

The flowchart of FIG. 4 is a method that may be implemented by machine readable instructions that comprise one or more programs that, when executed by a processor (such as the processor 210 of FIG. 2), cause the vehicles 100 and 102 to implement the encryption controller 114 of FIGS. 1 and 2. Further, although the example program(s) is/are described with reference to the flowcharts illustrated in FIG. 4, many other methods of implementing the example encryption controller 114 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   sensors; and
   a controller configured to:
     detect, via the sensors, a dynamic attribute and a static identifier of a target vehicle;
     generate a pseudo-anonymous identifier by hashing the identifier and the attribute;
     broadcast a first message including the pseudo-anonymous identifier, a random number, and a public key; and
     responsive to receiving a second message including a symmetric key, the identifier and the random number, broadcast a third message using the symmetric key.

2. The vehicle of claim 1, wherein the sensors include a camera and an ultrasonic sensor.

3. The vehicle of claim 1, wherein the identifier of the target vehicle is a license plate number and the attribute of the target vehicle is speed.

4. The vehicle of claim 1, the controller is further configured to: responsive to receiving a second message, decrypt the second message with a private key corresponding to the public key to determine the identifier and the random number included in the second message.

5. The vehicle of claim 1, wherein the second message includes the symmetric key.

6. The vehicle of claim 1, wherein the controller is further configured to broadcast the third message without verifying an identity of the target vehicle with a trusted authority.

7. The vehicle of claim 1, wherein the controller is further configured to hash the identifier and the attribute by using a one-way hash function.

8. The vehicle of claim 1, wherein the controller is further configured to, prior to hashing the identifier and the attribute, round a value of the attribute.

9. The vehicle of claim 1, wherein the second message further includes the attribute, wherein the attribute and the identifier included in the second message are unhashed.

10. The vehicle of claim 9, wherein the controller is further configured to, responsive to the attribute and the identifier included in the second message matching the attribute and the identifier included in the first message, broadcast the third message using the symmetric key.

11. The method of claim 1, wherein the identifier is a static attribute of the target vehicle and the attribute is a variable attribute of the target vehicle.

12. The method of claim 11, wherein the attribute of the target vehicle is the target vehicle's coordinates.

13. The method of claim 11, wherein the attribute of the target is the target vehicle's compass direction.

14. A method to establish private communication with a target vehicle, the method comprising:
   detecting, via sensors, an identifier and an attribute of the target vehicle;
   generating, with a processor, a pseudo-anonymous identifier by hashing the identifier and the attribute of the target vehicle;
   broadcasting a first message including the pseudo-anonymous identifier, a random number, and a public key; and
   in response to receiving a second message including the identifier and the random number, broadcasting a third message encrypted with a symmetric key included in the second message.

15. The method of claim 14, wherein the identifier of the target vehicle is obtained with a camera and the attribute of the target vehicle is obtained with an ultrasonic sensor.

16. The method of claim 14, wherein the identifier of the target vehicle is a license plate number and the attribute of the target vehicle is speed.

17. The method of claim 14, including, in response to receiving a second message, decrypting the second message with a private key corresponding to the public key to determine the identifier and the random number included in the second message.

18. The method of claim 14, wherein the second message includes the symmetric key.

19. The method of claim 14, including broadcasting the third message without verifying an identity of the target vehicle with a trusted authority.

20. A method to privately communicate between a first and second vehicle comprising:
   detecting, via sensors of the first vehicle, a discernible static identifier and a measurable dynamic attribute of the second vehicle;
   generating, by the first vehicle, a first pseudo-anonymous identifier by hashing the discernible identifier and the measurable attribute of the second vehicle;
   broadcasting, by the first vehicle, an initial message that includes the first pseudo-anonymous identifier, a random number, and a public key;
   comparing, by the second vehicle, the first pseudo-anonymous identifier to a second pseudo-anonymous identifier generated by the second vehicle based on the discernible identifier and measurable attribute of the second vehicle;
   in response to a match, generating, by the second vehicle, response message encrypted with the public key, the response message including the random number, the discernible identifier of the second vehicle, and a symmetric key;
   communicating, by the first vehicle, with second vehicle using the symmetric key when the random number and the discernible identifier of the second vehicle in the response message match the discernible identifier used to generate the first pseudo-anonymous identifier and the random number in the initial message.

* * * * *